United States Patent

White

[15] 3,638,617
[45] Feb. 1, 1972

[54] DEER AND WILD TURKEY FEEDER

[72] Inventor: Matthew G. White, P.O. Box 1601, Uvalde, Tex. 78801

[22] Filed: Aug. 13, 1970

[21] Appl. No.: 63,577

[52] U.S. Cl. ................................ 119/51, 119/53.5, 119/54
[51] Int. Cl. ......................................................... A01k 5/00
[58] Field of Search ........................... 119/51, 56 A, 53.5, 54

[56] References Cited

UNITED STATES PATENTS

| | | | |
|---|---|---|---|
| 1,879,247 | 9/1932 | Holliday | 119/54 |
| 2,632,423 | 3/1953 | Cordis | 119/56 A |
| 3,515,098 | 6/1970 | Thurmond | 119/51 R |
| 3,537,429 | 11/1970 | Regan | 119/51 R |

*Primary Examiner*—Aldrich F. Medbery
*Attorney*—Clarence A. O'Brien and Harvey B. Jacobson

[57] ABSTRACT

A granular feed hopper for animals including a lower downwardly opening gravity outlet. A generally horizontal panel member is disposed in vertical registry with the outlet only slightly spaced below the latter such that the angle of repose of granular feed being gravity discharged through the outlet will fall within the plan area of the panel member. However, the spacing of the panel member below the outlet is appreciably greater than the largest dimension of individual feed particles to be dispensed from the hopper and the panel member is mounted for rotation about an upstanding axis, whereby the feed being discharged from the outlet and resting upon the panel will be disturbed and moved from beneath the pile of feed resting upon the panel member as the latter is rotated. In addition, the panel member includes peripherally spaced portions which are disposed appreciably radially outwardly from the axis of rotation of the panel member and exposed for attachment of feed thereto. These outer peripheral portions of the panel member attract the birds to be fed and the birds, by pecking at the feed supported from these outer peripheral portions of the panel member, cause the latter to rotate and thus feed from the hopper to be pulled from the bottom of the pile of feed resting upon the panel member.

11 Claims, 3 Drawing Figures

PATENTED FEB 1 1972  3,638,617

Matthew G. White
INVENTOR.

BY Clarence A. O'Brien
and Harvey B. Jacobson
Attorneys

DEER AND WILD TURKEY FEEDER

The feeder of the instant invention has been designed to be supported at an elevation selected to conform to the height of the birds which are to be fed from the feeder. In addition, the feeder is constructed in a manner whereby a relatively large quantity of feed may be disposed therein in a protected condition against the elements. Also, the feeder includes discharge apparatus for controlling the discharge of feed therefrom and constructed in a manner whereby the discharge apparatus will prevent the feed from being discharged from the reservoir portion of the feeder until such time as the discharge apparatus is actuated by a bird in the area immediately adjacent the feeder and thus in a position to eat the feed to be discharged therefrom.

The feeder has been designed so as to be specifically adapted to feed wild turkeys. However, the feeder could be utilized as a feeder for other birds if desired.

The main object of this invention is to provide a feeder specifically adapted for feeding wild turkeys.

Another object of this invention is to provide a feeder constructed in a manner whereby a large quantity of feed may be stored within the feeder in a protected condition against the elements and gradually dispensed therefrom for eating by turkeys only when the discharge apparatus of the feeder is actuated by turkeys immediately adjacent the feeder.

Yet another object of this invention, in accordance with the immediately preceding object, is to provide a turkey feeder specifically adapted for use in remote locations and constructed in a manner whereby the feeder itself may be readily adjusted for dispensing feed of different granular size.

A final object of this invention to be specifically enumerated herein is to provide a feeder in accordance with the preceding objects and which will conform to conventional forms of manufacture, be of simple construction and automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
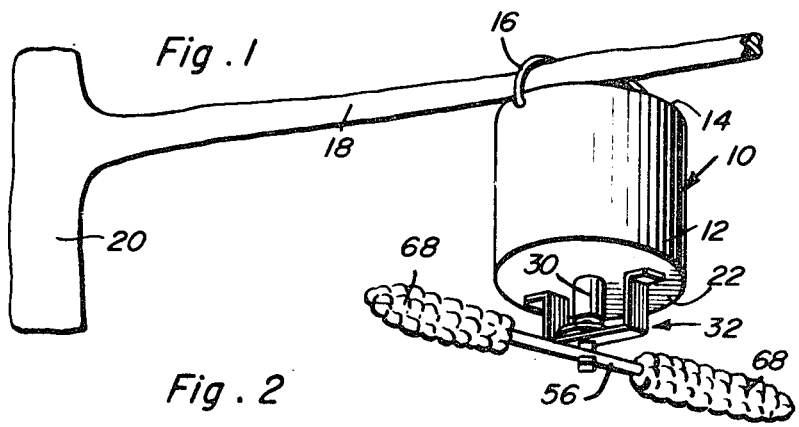
FIG. 1 is a perspective view of the feeder supported from a tree branch.

Referring now more specifically to the drawings, the numeral 10 generally designates the turkey feeder of the instant invention. The feeder 10 includes a generally cylindrical housing 12 which may include a removable upper end wall 14 and a pivoted bail 16 at its upper end for hanging the feeder 10 from a suitable support such as the branch 18 of the tree 20 illustrated in FIG. 1.

The housing 12 includes an integral bottom wall 22 which is centrally apertured as at 24 and a discharge funnel or false bottom 26 is disposed within the lower end of the housing 12 with the outlet opening 28 of the funnel 24 registered with and forming an upward continuation of the central aperture or opening 24 formed in the bottom wall 22. The funnel 26 may be secured within the housing 12 in any convenient manner.

A small diameter tubular discharge neck 30 has its upper end supported from the bottom wall 22 about the opening 24 and a U-shaped support bracket 32 is supported from the bottom wall 22. The U-shaped support bracket includes a pair of upstanding legs 34 and 36 interconnected at their lower ends by means of a horizontal bight portion 38 and the upper ends of the legs 34 and 36 include apertured out-turned flange portions 40 and 42 which are secured to the bottom wall 22 by means of suitable fasteners 44 secured through the flange portions 40 and 42 and the bottom wall 22.

The legs 34 and 36 each includes lower slotted end portions 46 which are formed integrally with and project upwardly from the opposite ends of the bight portion 38 and upper sections 48 formed integrally with the flange portions 40 and 42 and which have vertically spaced apertures 50 formed therein registered with the corresponding slots 46' formed in the lower sections 46. The lower ends of the upper sections 48 are lapped over the remote sides of the lower sections 46 and a pair of fasteners 52 are secured through each pair of apertures 50 and the corresponding slot 46' for securing the sections 46 and 48 adjusted overlapped condition.

An upstanding shank portion 54 including a threaded lower end portion 55 projects through the discharge neck 30 with the lower end thereof extending downwardly below the neck 30. The central portion of the bight portion 38 has an aperture 38' formed therethrough and the lower end of the shank portion 54 projects through the aperture 38' and has a horizontal crossarm 56 secured thereto by means of jamnuts 58 threaded on the shank portion 54 above and below the center portion of the arm or rod 56. In addition, a centrally aperture discharge disk 60 is mounted on the shank portion 54 above the bight portion 38 by means of jamnuts 62' and 62 respectively threaded on the shank portion 54 above and below the disk 60 and the shank portion 54 has an upper thrust disk 64 fixedly mounted thereon below the lower nut 62 and a lower thrust disk or washer 66 secured thereon below the bight portion 38 and above the upper nut 58 The thrust disk 64 prevents downward movement of the shank portion 54 relative to the bight portion 38 and the entire shank portion 54 may be adjusted in elevation by means of the adjustable connection between the sections 46 and 48 of the legs 34 of the support bracket 32. In addition, the elevation of the disk 60 on the shank portion 54 may be adjusted by means of the jamnuts 62 and 62'.

Figure 2:
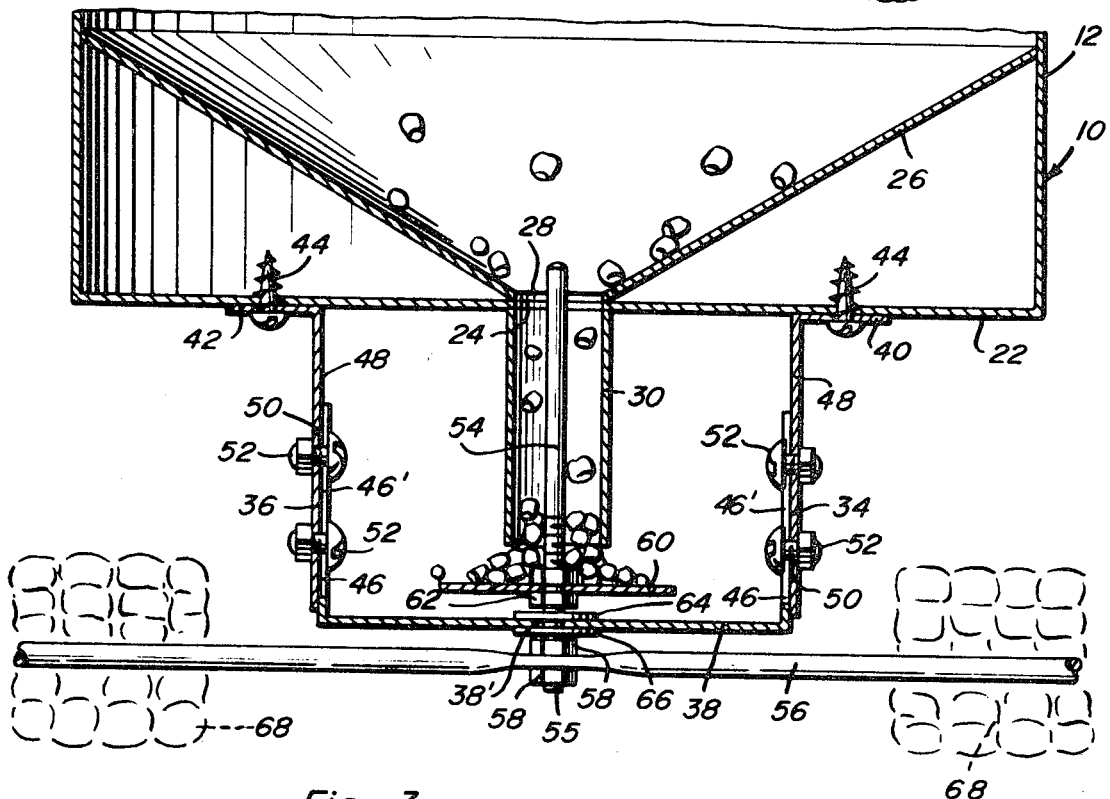
FIG. 2 is an enlarged fragmentary vertical sectional view taken substantially upon a plane passing through the center of the lower portion of the feeder.
Figure 3:
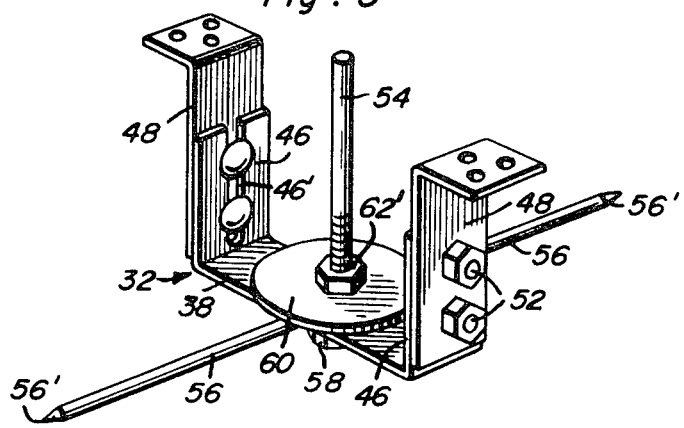
FIG. 3 is a perspective view of the discharge apparatus assembly of the feeder.

In operation, the feed to be dispensed from the feeder 10 is placed within the housing 12 through the removable upper end wall 14 thereof and the housing 12 may then be suspended from the limb 18 in the manner illustrated in FIG. 1 of the drawings. Thereafter, two ears of corn or other bait may be impaled on the opposite ends of the arms or rods 56 which are sharpened as at 56'. This bait attract the birds to be fed fro the feeder 10 and the birds peck at the bait which is illustrated in FIGS. 1 and 2 of the drawings as two ears of corn and designated by the reference numerals 68. As the birds to be fed peck on the corn 68, the arms or rods 56 are swung in a horizontal plane to impart rotation to the shank portion 54 whereupon the disk 60 will be rotated and the quantity of feed resting between the lower end of the discharge nozzle 30 and upon the upper surface of the disk 60 will be moved, disturbed and pulled from beneath the pile of feed emerging from the discharge nozzle and resting upon the disk 60 to thus dispense this feed to and off the outer peripheral portions of the disk 60 for falling upon the ground beneath the feeder 10 and ultimate consumption by the birds to be fed at the feeder 10.

If it is desired, the feeder 10 may be supported in elevated position above the ground as desired from any suitable support object. Further, the housing may be constructed of any suitable material as may the support bracket 32 and arm or rod 56. Also, it will be noted that there is very little friction resisting rotation of the shank portion 54 and therefore that one peck of a turkey on either of the ears 68 may be sufficient to cause at least some corn to be dispensed from the disk 60 to the ground beneath the feeder 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A granular feed dispenser for animals including a hopper body with a lower downwardly opening outlet, a generally horizontal panel member disposed in vertical registry with said outlet only slightly spaced below the latter a distance such that the angle of repose of granular feed from the outlet and resting upon the panel member will fall adjacent to but within the edge of the plan area of the panel member, the panel member being mounted for rotation about a vertical axis and spaced below the outlet a distance greater than the largest dimension of feed to be dispensed from the feed dispenser, said panel member comprising a portion of a rotary assembly including a downwardly extending animal actuated means having further portions thereof spaced radially outwardly of said axis for supporting bait thereon.

2. The combination of claim 1 wherein said body includes a generally flat bottom wall in which said outlet is centrally disposed, and an upwardly opening conical false bottom wall in said body having a central lower outlet opening therein registered with a forming an upward continuation of the downwardly opening outlet of said body.

3. The combination of claim 1 wherein said body includes a generally horizontal bottom wall in which a central opening outlet is formed comprising a part of said downwardly opening outlet, the latter also including an upstanding tubular discharge neck whose upper end is secured to said bottom wall about said outlet opening therein.

4. The combination of claim 3 wherein said dispenser includes a stationary support spaced below and in vertical registry with the lower end of said outlet neck, an upstanding shank portion rotatably journaled from said support and projecting centrally upwardly into said neck, said panel member being mounted on said shank portion above said support for rotation therewith.

5. The combination of claim 4 wherein said support includes means for vertically adjusting said panel member.

6. The combination of claim 4 wherein said panel member comprises a circular disk concentric with said axis.

7. The combination of claim 4 wherein said portions of said rotary assembly are spaced outwardly from said axis and comprise generally horizontal rod portions carried by the lower end of said shank portion and projecting generally radially outwardly of the latter.

8. The combination of claim 7 wherein said rod portions are disposed below said support.

9. The combination of claim 8 wherein said panel member comprises a circular disk concentric with said axis.

10. The combination of claim 4 wherein said support comprises an upwardly opening U-shaped member including a pair of upstanding legs interconnected at their lower ends by means of a bight portion extending therebetween, the upper ends of said legs being supported from the underside of said tubular body, said shank portion being journaled through said bight portion.

11. The combination of claim 10 wherein said legs include means for adjusting their effective length.

* * * * *